United States Patent Office 3,485,804
Patented Dec. 23, 1969

3,485,804
NOVEL AROMATIC POLYAMIDE FROM DIAMINE CONTAINING PRIMARY AMINO GROUP AND SECONDARY AMINO GROUP
Yasuro Kawabata, Haruki Maekawa, Masamoto Watanabe, and Yoshizo Tsuda, Ohtsu-shi, Japan, assignors to Toyo Rayon Kabushiki Kaisha, Nihonbashi-Muromachi Chuo-ku, Tokyo, Japan, a corporation of Japan
No Drawing. Filed June 6, 1967, Ser. No. 643,817
Claims priority, application Japan, June 9, 1966, 41/36,788
Int. Cl. C08g 20/20
U.S. Cl. 260—78     5 Claims

ABSTRACT OF THE DISCLOSURE

A substantially linear polyamide having a high melting point and a high solubility in organic solvents which consists essentially of repeating units of the following structural formula:

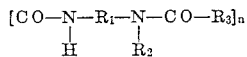

wherein $R_1$ represents a phenylene group, $R_2$ represents an alkyl, aralkyl or aryl group and $R_3$ represents a divalent aromatic group, useful in dry or wet spinning or shaping an organic solution of said polyamide into fibers and other articles having a thermal stability.

---

This invention relates to a novel polyamide, and more particularly to a novel polyamide having a high melting point and solvent-solubility wherein residual groups of an aromatic diamine having a primary amino group at one end and a secondary amino group at other in its molecule, and residual groups of an aromatic dicarboxylic acid form main chains by acid-amide linkages. The invention also concerns a process for the preparation of such novel polyamide.

Heretofore, many polyamides having a high melting point have been synthesised with a view to obtaining fibers having a thermal stability, and have been reported in literature. Some of such high melting polymers have already been manufactured on a commercial basis.

As such high melting polyamide, there have been known, for instance, polyamides prepared from a primary diamine and a dicarboxylic acid, such as polyhexamethylene terephthalamide (M.P. 370° C.), poly-m-phenylene isophthalamide (M.P. 385° C.) and poly-N,N'-m-phenylene bis(m-benzamide) isophthalamide (decomposition point 425° C.). It has also been known, however, that various difficulties are encountered in the step of shaping these high melting polyamides into fibers and other articles. For example, it is extremely difficult, because of a high melting point, to melt such polyamides without involving their decomposition. Consequently, the spinning and shaping of these high melting polyamides are performed by means of a dry or wet spinning or shaping wherein a polymer solution is used. Difficulty is also met here as the solubility of a high melting polyamide is generally very low. Many of such high melting polyamides are soluble only in such solvents as concentrated sulphuric acid and a special fluorine-containing solvent, and are difficultly soluble in commercially usable solvents. To raise the solubility of a high melting polyamide in an organic solvent and to obtain a polymer solution of a high concentration, a method in which an inorganic salt such as lithium chloride is caused to be present jointly with the polymer in a polar organic solvent is being practised, but cannot be free from commercial disadvantages.

We have found that polyamides prepared by polymerising aromatic diamines having one primary amino group and one secondary amino group in a molecule and aromatic dicarboxylic acid dihalide have a high melting point and a high solubility in commercially usable solvents, and that these polyamides, even when exposed to high temperatures in air for a long time, are substantially stable.

It is an object of this invention to present substantially linear polyamides wherein residual groups of an aromatic diamine having a primary amino group at one end and a secondary amino group at other in its molecule, and residual groups of an aromatic dicarboxylic acid form main chains by acid-amide linkages, and a process for its preparation.

Another object of this invention is to provide a novel polyamide having a high melting point and a high solubility in commercially usable solvents which, when exposed to high temperatures in air for a long time, remains stable. Still another object of this invention is to provide a novel polyamide from which films and filaments having a thermal stability can be prepared.

The polyamide of this invention has the repeating unit of the structural formula:

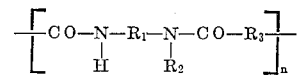

wherein $R_1$ and $R_3$ stand for a divalent aryl group and $R_2$ stands for a lower alkyl, lower aralkyl or aryl group, with the proviso that the aryl group of $R_1$, $R_2$ and $R_3$ may be substituted with a halogen atom, lower alkyl or alkoxy group.

As the divalent aryl group of the said $R_1$ and $R_3$, there are phenylene, naphthylene and diphenylene groups, wherein the divalent bonds are oriented in a meta of para relation with respect to each other, preferably, m-phenylene, p-phenylene, 2,6-naphthylene and 4,4'-diphenylene group.

As the lower alkyl group of the said $R_2$, there are alkyl groups having 1 to 5 carbon atoms, preferably methyl, ethyl, propyl, isopropyl, butyl and isobutyl group. The lower aralkyl group of $R_2$ is one such as an alkyl group having 1 to 5 carbon atoms substituted with aryl groups such as phenyl, diphenyl and naphthyl group, preferably benzyl and phenylethyl group. As the aryl group of $R_2$, there are phenyl, diphenyl and naphthyl groups. If $R_1$, $R_2$ and $R_3$ have an aromatic ring, their aromatic ring such as benzene, naphthalene and diphene ring may be substituted with at least one halogen atom such as fluorine, chlorine and bromine; lower alkyl group such as methyl, ethyl and propyl group, or lower alkoxy groups such as methoxy, ethoxy and propoxy group.

Especially preferable polyamides are

⁅amido group-p-phenylene-N-methylamido group-p-phenylene⁆$_n$,

⁅amido group-p-phenylene-N-isobutylamide group-p-phenylene⁆$_n$,

⁅amido group-m-phenylene-N-methylamido group-p-phenylene⁆$_n$,

⁅amido group-4,4'-diphenylene-N-ethylamido group-p-phenylene⁆$_n$, and

⁅amido group-2,6-naphthylene-N-methylamido group-p-phenylene⁆$_n$.

The polyamide of this invention having the said repeating units has a very high solubility in organic solvents, and is dissolved in the absence of an inorganic salt in some solvents such a N,N-dimethylformamide, N,N-dimethylacetamide, tetrahydrofuran, N-methylpyrrolidone and fumaric acid to form a polymer solution of a high concentration. The spinning of the polyamide is therefore very easy. Another remarkable feature of the polyamide of this invention is that it has a high melting point in spite of its high solubility. The melting point, although affected especially by the structure of molecules, ranges from 250° C. to 400° C. Furthermore, the polyamide of this invention is stable even when exposed to high temperatures in air for a long time.

Having a melting point high enough as a starting material for thermally stable fibers and other articles and also a high solubility and stability, the polyamide of this invention is a polyamide which is easy to spin and shape.

The polyamide of this invention, when having a logarithmic viscosity, given by the following formula, of at least 0.5, preferably 0.5 to 2.5, has a practical value and can be shaped into films, filaments and other articles.

$$\text{Logarithmic viscosity} = \frac{\text{natural logarithm} \left( \frac{\text{time for flowing down of polymer solution}}{\text{time for flowing down of solvent}} \right)}{\text{concentration of polymer}}$$

The concentration is measured on the basis of 0.5 g. (polymer)/100 ml. (N-methylpyrrolidone), and the viscosity is measured at a temperature of 30° C.

The polyamide of this invention is manufactured by condensation polymerising an aromatic diamine having one primary amino group and one secondary amino group in its molecule with an aromatic dicarboxylic acid dihalide.

As the aromatic amine, one component of the polyamide of this invention, there are N-substituted aryldiamine such as N-substituted phenylenediamine, N-substituted diphenediamine and N-substituted naphthalenediamine, preferably those in which diamino groups are meta or para-oriented with respect to each other, for example, N-substituted phenylene diamine such as N-substituted m- or p-phenylenediamine, N-substituted diphenediamine, and N-substituted 4,4'-diphenediamine and 3,3'-diphenediamine, and N-substituted naphthalenediamine such as N-substituted 2,6-naphthalenediamine, and N-substituted 2,7-naphthalenediamine.

As the said N-substituted groups, there are a lower alkyl, lower aralkyl and aryl group. The said lower alkyl group is an alkyl group having 1 to 5 carbon atoms preferably methyl, ethyl, propyl, isopropyl, butyl or isobutyl group. The said lower aralkyl group includes an alkyl group having 1 to 5 carbon atoms, preferably benzyl and phenyl ethyl group. As the aryl group, there are phenyl, diphenyl and naphthyl groups. The aromatic ring such as benzene, naphthalene and diphenyl ring of the aromatic diamine may be sustituted with a halogen atom such as fluorine, chlorine, and bromine, lower alkyl such as methyl, ethyl and butyl, or lower alkoxy such as methoxy, ethoxy and propoxy.

Suitable aromatic diamines include N-methyl-p-phenylenediamine, N-butyl-p-phenylenediamine, N-methyl-m-phenylenediamine, N-benzyl-p-phenylenediamine, N-methyl-4,4'-diphenediamine, N-benzyl-4,4'-diphenediamine, N-ethyl-4,4'-diphenediamine, N - methyl-2,6-naphthalenediamine, N-phenyl-p-phenylenediamine and N-diphenyl-p-phenylenediamine.

The aromatic dicarboxylic acid dihalide, other component of the polyamide of this invention, includes phenylene dioyl halides such as terephthaloyl halide and isophthaloyl halide; diphenedioyl halides such as 4,4'-diphenedioyl halide and 3,3'-diphenedioyl halide; and naphthalenedioyl halide such as 2,6-naphthalenedioyl halide and 2,7-naphthalenedioyl halide. As the halide, fluoride, chloride and bromide are used, the chloride being preferred.

The aromatic ring such as benzene, naphthalene and diphene ring of the aromatic dicarboxylic acid dihalide may be substituted with a halogen atom such as fluorine, chlorine and bromine, lower alkyl such as methyl, ethyl and butyl, or lower alkoxy such as methoxy, ethoxy and propoxy.

Examples of the preferable aromatic dicarboxylic acid dihalide are terephthaloyl chloride, isophthaloyl chloride, 4,4'-diphenedioyl chloride and 2,6-naphthalenedioyl chloride.

The condensation polymerisation between the said diamine and the said dicarboxylic acid dihalide is effected in the form of solution polymerisation. Namely, the said polymerisation reaction is carried out in at least one solvent selected from the group consisting of organic tertiary bases such as N,N-dimethylformamide, N,N-dimethylacetamide, N-methylpyrrolidone and hexamethyl phosphorus amide, halogenated hydrocarbons such as methylene chloride, 5-membered cyclic ethers such as tetrahydrofuran, and tetramethylene sulphone. This polymerisation reaction can also be performed in the form of interfacial polymerisation between an aqueous solution of the said diamine and the said acid halide solution in a water-immiscible organic solvent. As the water-immiscible organic solvent, halogenated hydrocarbons such as methylene chloride, and tetramethylene sulphone are usable.

It is preferable that the said polymerisation reaction should be carried out in the presence of an acid-binding agent. When an organic tertiary base is used as the solvent, it also serves as an acid-binding agent. If the polymerisation reaction is carried out in the form of interfacial polymerisation, the acid-binding agent is not necessarily essential.

Usable as the acid-binding agent are organic tertiary bases such as trimethylamine, triethylamine, pyridine, N,N - dimethylformamide, N,N - dimethylacetamide, N - methylpyrrolidone and hexamethyl phosphorus amide. In the case of interfacial polymerisation, water-soluble bases insoluble in organic solvents capable of dissolving the said acid halide, such as trimethylamine and triethylamine, and inorganic bases are used as the acid-binding agent, the carbonate of alkali metal such as lithium carbonate, potassium carbonate and sodium carbonate being preferred. In addition, alkali hydroxides such as sodium hydroxide and potassium hydroxide can be used.

The reaction temperature is optionally chosen within the range of −30° C. to 70° C. It must be mentioned that the temperature little affects the degree of polymerisation in practising the process of this invention.

By the procedures detailed above, the novel polyamide of this invention is obtained.

Now, the invention will be described by the following examples which in no way restrict the invention. The logarithmic viscosity described below is as defined above.

EXAMPLE 1

N-methyl-p-phenylenediamine (2.000 g.), and 3.476 g. of sodium carbonate were dissolved in 22.5 cc. of water. While agitating the resulting solution by means of a whirling blender, a solution of 3.344 g. of terephthalic acid chloride in 22.5 cc. of methylene chloride was added thereto at a time. The reactant mixture, while being maintained at room temperature by a water bath, was agitated for about 10 minutes. The formed polymer was purified by filtration, water-washing and reprecipitation, and a white polymer having a melting point of about 400° C. (determined by differential thermal analysis) and a logarithmic viscosity of 0.52 was obtained.

This polymer is well soluble in N,N-dimethylacetamide and gives a polymer solution with a polymer concentration of about 30%.

EXAMPLE 2

N-isobutyl-p-phenylenediamine (0.6950 g.) and 0.8969 g. of sodium carbonate were dissolved into a mixture of 15 cc. of water and 10 cc. of tetrahydrofuran. Into the resulting solution was added a solution of 0.8642 g. of terephthalic acid chloride in 15 cc. of methylene chloride under agitation. The resulting polymer was treated in the same manner as in Example 1 and re-precipitated. A polymer having a melting point of 290 to 295° C. and a logarithmic viscosity of 0.45 was obtained.

The polymer is soluble in N,N-dimethylacetamide and gives a polymer solution with a polymer concentration of about 30%. It is soluble in organic solvents such as N-methylpyrrolidone, N,N-dimethylformamide and tetrahydrofuran.

EXAMPLES 4–8

Example 3 was repeated using the diamine, acid dihalide and solvent indicated in Table III to give a polyamide shown in Table III.

TABLE III

| | | | | Polyamide | |
|---|---|---|---|---|---|
| Diamine, g. | Acid dihalide, g. | Solvent, cc. (DMAc) | Logarithmic viscosity | M.P. | |
| Example: | | | | | |
| 4 .......... N-methyl-p-phenylene diamine, 15.3661 | Isophthaloyl chloride, 25.5364 | 130 | 1.21 | 280° C. (softened). | |
| 5 .......... N-methyl-p-phenylene diamine, 13.5826 | 2,6-naphthalenedioyl chloride, 28.1369 | 132 | 1.05 | 380° C. (softened). | |
| 6 .......... N-methyl-p-phenylene diamine, 12.6755 | 4,4'-diphenylenedioyl chloride, 28.9585 | 132 | 0.93 | No showing of M.P.; decomposed at 400° C. | |
| 7 .......... N-isobutyl-p-phenylene diamine, 18.3475 | Terephthaloyl chloride, 22.6794 | 130 | 1.16 | 290° C. (softened). | |
| 8 .......... N-benzyl-p-phenylene diamine, 18.8673 | Terephthaloyl chloride, 19.3212 | 120 | 0.83 | 250° C. (softened) | |

EXAMPLE 3

A four-necked flask provided with a thermometer, agitator and nitrogen inlet and outlet ports was charged with 16.0895 g. of N-methyl-p-phenylenediamine and 136 cc. of N,N-dimethylacetamide, and the mixture was dissolved by agitating under an atmosphere of nitrogen. The resulting solution was cooled to −22° C. by using a Dry Ice-acetone bath, and while agitating in an atmosphere of nitrogen, 26.7400 g. of granular terephthalic acid chloride was added to this solution at a time. After the addition of the terephthalic acid chloride, the Dry Ice-acetone bath was replaced by an ice bath. When the temperature of the polymer solution rose to 26° C., the solution was cooled to about 7° C. The polymerisation was completed when the said solution was maintained at this temperature for about one hour. The so obtained polymer solution was diluted with N,N-dimethylformamide. The diluted solution was poured dropwise into a water-methanol system to give a polymer in a white powdery form having a logarithmic viscosity of 1.17.

The polyamide obtained in accordance with the above-mentioned method was dissolved in N,N-dimethylacetamide in a concentration of 15 to 30% by weight. A transparent, tenacious film was obtained by pouring the solution on a glass sheet and drying it. The film was increased in tenacity by stretching and showed an excellent thermal stability.

Table I shows the tensile strength and elongation at room temperature of said film heated to 200° C., and Table II shows its tensile strength at high temperatures.

TABLE I

| Heating time, hours: | Tensile strength, kg./mm.² | Elongation, percent |
|---|---|---|
| 0 | 31.5 | 8 |
| 24 | 22.0 | 7 |
| 48 | 23.2 | 9 |
| 72 | 24.3 | 9 |
| 96 | 24.9 | 8 |
| 120 | 25.0 | 8 |
| 144 | 25.3 | 7 |
| 168 | 25.0 | 7 |

TABLE II

| Temperature (° C.): | Tensile strength (kg./mm.²) |
|---|---|
| 20 | 31.5 |
| 50 | 25.0 |
| 100 | 25.0 |
| 150 | 26.4 |
| 200 | 20.7 |
| 250 | 19.6 |

In the above examples, the yields of the polyamides are 92 to 97% of the calculated values.

What is claimed is:

1. A substantially linear polyamide having a high melting point and a high solubility in organic solvents which polyamide consists essentially of repeating units of the following structural formula:

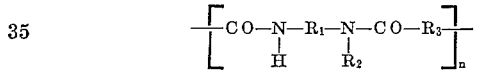

wherein $R_1$ represents a phenylene group, $R_2$ represents an alkyl, aralkyl or aryl group and $R_3$ represents a divalent carbocyclic aromatic group.

2. The polyamide of claim 1 consisting essentially of repeating units of the following structural formula:

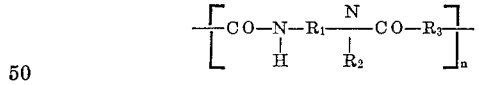

wherein $R_1$ represents a phenylene group and $R_3$ represents a phenylene, naphthylene or diphenylene group, and $R_2$ represents a lower alkyl group having 1–5 carbon atoms, aralkyl group wherein the alkyl group having 1 to 5 carbon atoms is substituted with either a phenyl, naphthyl or diphenyl group, a phenyl group, naphthyl group or diphenyl group, and having a logarithmic viscosity of at least 0.5 measured at 30° C. with respect to a solution of 0.5 g. of the said polyamide in 100 ml. of N-methylpyrrolidone.

3. The polyamide according to claim 2 wherein the lower alkyl group having 1 to 5 carbon atoms expressed by $R_2$ is selected from the class consisting of a methyl, propyl, isopropyl, butyl and isobutyl group.

4. The polyamide according to claim 2 wherein the aralkyl group expressed by $R_2$ is selected from the class consisting of a benzyl and phenylethyl group.

5. The polyamide according to claim 2 wherein the phenylene group, naphthylene group or diphenylene group expressed by $R_3$ is selected from the class consisting of a 1,4 - phenylene, 2,6 - naphthylene and 4,4' - diphenylene group.

(References on following page)

References Cited

UNITED STATES PATENTS

| | | | |
|---|---|---|---|
| 2,158,064 | 5/1939 | Carothers | 260—78 |
| 2,953,548 | 9/1960 | Schott et al. | 260—78 |
| 3,094,511 | 6/1963 | Hill et al. | 260—78 |
| 3,154,524 | 10/1964 | Martinek | 260—78 |
| 3,232,910 | 2/1966 | Preston | 260—78 |
| 3,296,201 | 1/1967 | Stephens | 260—78 |
| 3,297,656 | 1/1967 | Caldwell | 260—78 |
| 3,354,127 | 11/1967 | Hill et al. | 260—78 |

OTHER REFERENCES

Polyamide Resins—Floyd; Second edition (1966), pp. 15–17.

HAROLD D. ANDERSON, Primary Examiner

U.S. Cl. X.R.

117—161; 260—30.2, 30.4, 30.6, 30.8, 31.8, 32.6, 33.8, 47